April 8, 1958
W. M. REESE
2,829,673
PIPE UNIONS
Filed Aug. 24, 1954
2 Sheets-Sheet 1
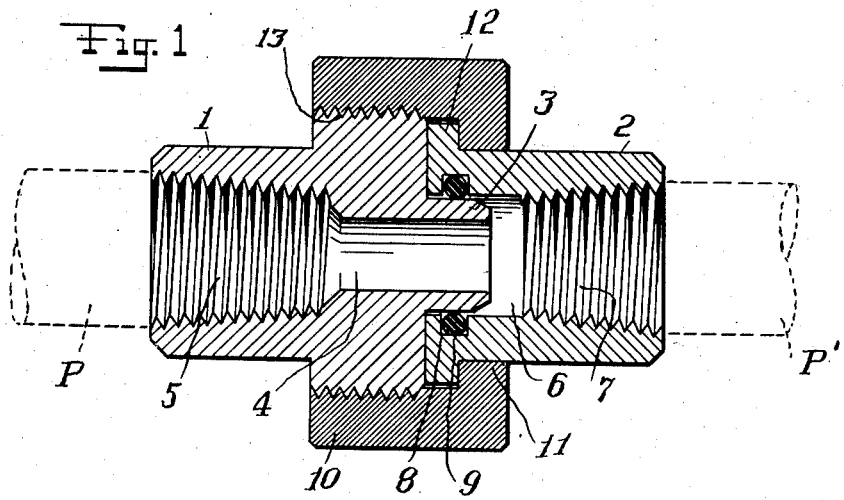
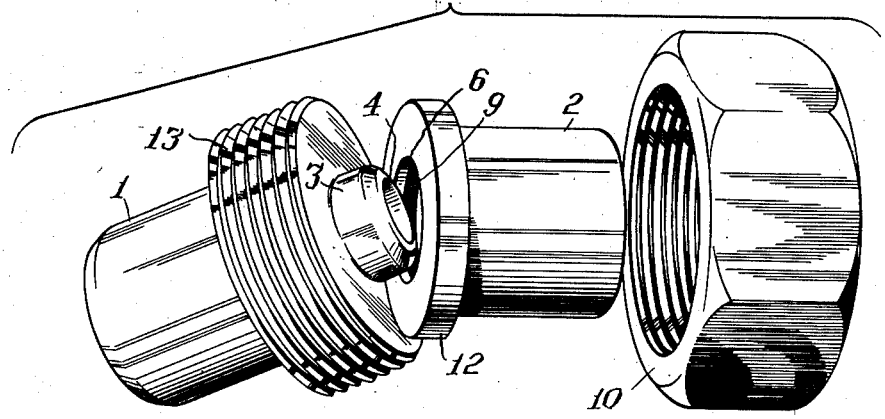
INVENTOR.
William M. Reese
BY
ATTORNEY April 8, 1958

W. M. REESE 2,829,673

PIPE UNIONS

Filed Aug. 24, 1954

INVENTOR.
William M. Reese
BY
ATTORNEY

United States Patent Office 2,829,673
Patented Apr. 8, 1958

2,829,673

PIPE UNIONS

William M. Reese, Odessa, Tex., assignor to Industrial Instrument Corporation, Odessa, Tex., a corporation of Texas Application August 24, 1954, Serial No. 451,851

2 Claims. (Cl. 138—44)

This application is a continuation-in-part of my prior application for Pipe Couplings, Serial No. 300,111, filed July 21, 1952, now abandoned.

This invention relates to improvements in pipe unions of the character used for joining together adjacent ends of pipe.

Most pipe couplings used in relatively high pressure lines, and even those for low pressure, usually requires a wrench-tight pressure connection in order to tighten them up substantially leak proof. Various attempts have been made to provide couplings which will prevent leakage of fluids therethrough, but these have been unsatisfactory or have required strong pressure of a wrench connection in order to prevent leakage.

One object of this invention is to provide a pipe union which will be substantially leak proof and at the same time may be connected and secured manually without requiring a wrench for tightening the sections.

Another object of the invention is to simplify and improve the construction of a pipe union to enable this to be manufactured inexpensively and yet to form an effective secure connection between sections of pipe or tubes that may be joined readily and is substantially leaf proof.

These objects may be accomplished according to certain embodiments of the invention by constructing the union of respective sections having a telescoping, interfitting relation, and sealing means between radially opposite portions of the interfitting connection, which will seal these parts effectively against leakage. The sections of the coupling may be joined together by manually adjustable means such as a nut threaded on one section and overlapping the other for securing the parts effectively.

The invention is illustrated in certain embodiments in the accompanying drawings in which:

Fig. 1 is a longitudinal sectional view through the union;

Fig. 2 is a disassembled perspective view of the parts thereof;

Figure 3:
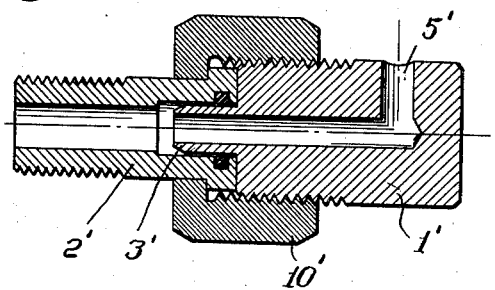
Fig. 3 is a longitudinal section through a modification thereof.

The pipe union shown as one embodiment of the invention in Figs. 1 and 2 comprises coupling sections 1 and 2 adapted for interfitting sealed relation with each other and to be connected with respective pipes or tubes P and P'. The size and bore of these respective sections may be varied as desired according to the use thereof and the character of the pipes or tubes with which they have to be joined.

The section 1 is shown as having a pilot extension 3 formed on one end thereof with a bore 4 extending through the section 1 to a screw-threaded socket 5 on one end of the section where it may be connected with a tube, pipe or other conduit P. The pilot extension 3 is appreciably reduced relative to the external diameter of the section 1 and is telescoped into a somewhat enlarged end portion 6 of the central bore 7 through the section 2, the outer end of which is threaded for connection with a pipe P'. The enlarged portion 6 is sufficiently larger in diameter than the bore 7 so that the internal diameter of the pilot extension 3 is substantially in longitudinal alignment with the bore 7, and thus the pilot extension is accommodated by and received in the longitudinal portion 6.

The section 2 is provided with an internal circumferential groove 8 surrounding the enlarged portion 6 of the central bore in the wall of the latter within which is located a packing ring 9. It is preferred that the packing ring 9 be constructed in the form of an O-ring seated in the groove 8 and projecting inwardly from the peripheral wall of the enlarged portion 6 of the bore sufficiently to form a tight sealing relation with the periphery of the pilot extension 3. Thus when the parts are fitted together as shown in Fig. 1, the ring 9 forms an effective seal about the periphery of the pilot extension 3 against the leakage of fluid therealong when the parts are drawn up even without great pressure.

The sections 1 and 2 may be connected together in any suitable manner, but for purpose of illustration, I have shown a coupling nut 10 having a flange 11 on one end thereof overlapping a radial flange 12 on the section 2. The nut 10 is adapted to be threaded onto a threaded portion 13 on the section 1 and when drawn up tightly will press the end of the section 2 against the end face of the section 1 around the pilot extension 3. A wrench-tight fit between these parts is not required. It will be sufficient, as I have found from experience, to draw up the nut 10 by hand without the necessity for applying great force thereto and yet the coupling will be sealed effectively against leakage of fluid as I have found from actual usage therewith.

The sections 1 and 2 are in direct abutting relation face-to-face at their adjacent ends and do not require any packing therebetween. The packing ring 9 is sufficient to form an effective seal between these sections without requiring any interposed packing at the ends thereof, even when the sections are drawn up by hand without a wrench-tight fit of the nut 10. The relatively soft rubber packing ring should fit sufficiently tightly in the groove 8 to be somewhat distorted by the insertion of the pilot extension 3 therethrough, but a tight sliding fit therebetween will be sufficient. This ring forms the sole sealing means for the union, and such a construction is sufficient to seal the union, even under relatively high pressures of the order of one thousand pounds per square inch.

The pilot extension 3 should be of sufficient extent to be inserted through the ring 9 when the sections of the union are coupled together, and yet may be withdrawn from sealing relation with the ring before the nut 10 is entirely unscrewed from its connection with the threads 13. Where a relatively loose fit is provided through the threads or around the inner diameter of the flange 11 in the nut, it is possible to unscrew the nut sufficiently to disengage the pilot extension from the packing ring 9 to depressurize a high pressure line before the parts are disconnected from each other. That prevents danger of injury to a workman who might otherwise unscrew the nut completely and cause serious injury to his person by being struck with parts of a union, if these were not securely connected when the pressure is released from the line.

The loose connection between the parts also makes it possible to assemble the union, even when there is very small tolerance between the adjacent ends of the pipes P and P' by swinging one of the sections relative to the other just sufficient to insert the pilot extension 3 into the packing ring 9 and the open end of the passage 6 in the section 2. This swinging motion thus possible enables the parts to be interconnected in smaller dimension than would be possible otherwise.

Figure 4:
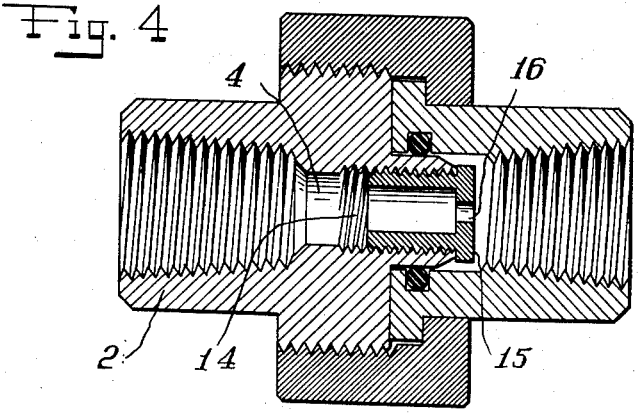
Fig. 4 is a similar view showing another modification of the invention.

The form of union shown in Fig. 4 is identical with that shown in Figs. 1 and 2, except that the section 2 has its central bore 4 internally threaded at 14 to receive therein a plug 15 having an orifice 16 in the end thereof. This plug 15 can be inserted into the screw-threaded portion 14 before connection of the sections of the union and will therefore provide a reducer opening through the line that may be needed under some circumstances for reducing the flow therethrough.

Another modification is shown in Fig. 3 in which the pilot extension 3' is somewhat longer than is the extension 3 in Fig. 1, but nevertheless it is still less than the overlapped threaded connection of the nut 10' with the section 1'. Therefore, it is also possible with that form of the invention to depressurize the line in the manner described above. The union section 2' is externally threaded for connection with a pipe, while the bore through the section 1' has a lateral opening at 5', either to the atmosphere for discharging the pressure therefrom, or this lateral opening may be connected with a suitable conduit or pipe.

This pipe union is constructed of few parts, whereby it may be manufactured inexpensively and used in any desired location for joining a pipe, tube or other conduit with any desired body or conduit section and will form an effective connection therebetween which may be tightened or loosened readily by hand without the necessity for a wrench-tight fit. At the same time an effective seal is provided which is leak proof in service even under relative high pressures, as has been found from actual use thereof in practice.

While the invention has been illustrated and described in certain embodiments, it is recognized that variations and changes may be made therein without departing from the invention as set forth in the claims.

I claim:

1. In a pipe union, a pair of sections arranged in axial alignment and having an axial passageway extending therethrough, said sections having adjacent ends in abutting relation with each other in a plane transverse to the axial passageway, one of the sections including a pilot extension projecting an appreciable distance beyond the abutting ends into the other section, the axial passageway of the other section having a surrounding groove in the surface thereof, and an O-ring mounted in said groove to form a seal between the pilot extension and the other section, said groove being longitudinally spaced from said transverse plane, said pilot extension projecting an appreciable distance through and beyond the O-ring when the abutting ends are in engagement with each other and sealing the sections against leakage from the passageway when the abutting ends are out of engagement with each other.

2. A pipe union comprising a pair of sections arranged in axial alignment and having an axial passageway extending therethrough, one of said sections having a surrounding flange thereon, said sections having adjacent ends in abutting relation with each other in a plane transverse to the axial passageway, a coupling member sleeved over said adjacent ends of the sections with a portion bearing against said flange and having screw-threaded connection with the other section for adjustably connecting the sections together, one of the sections including a pilot extension projecting an appreciable distance beyond the abutting ends into the other section, the axial passageway of the other section having a surrounding groove in the surface thereof, and an O-ring mounted in said groove to form a seal between the pilot extension and the other section, said groove being longitudinally spaced from said transverse plane, said pilot extension projecting an appreciable distance through and beyond the O-ring when the abutting ends are in engagement with each other and sealing the sections against leakage from the passageway when the abutting ends are out of engagement with each other.

References Cited in the file of this patent

UNITED STATES PATENTS

| 1,764,774 | Bloom | June 17, 1930 |
| 1,939,509 | McClelland | Dec. 12, 1933 |
| 2,631,049 | McGillis et al. | Mar. 10, 1953 |
| 2,661,965 | Parmesan | Dec. 8, 1953 |

FOREIGN PATENTS

| 28,930 | Great Britain | 1909 |
| 840,178 | Germany | May 29, 1952 |